United States Patent

[11] 3,615,771

[72] Inventor Gerald S. Meiling
 Medford, Mass.
[21] Appl. No. 761,802
[22] Filed Sept. 23, 1968
[45] Patented Oct. 26, 1971
[73] Assignee Corning Glass Works
 New York, N.Y.

[54] PHOTOCHROMIC GLASS
 3 Claims, No Drawings
[52] U.S. Cl. .................................................. 106/54,
 106/DIG. 6
[51] Int. Cl. ................................................... C03c 3/04
[50] Field of Search ...................................... 106/52, 54

[56] References Cited
UNITED STATES PATENTS

| | | | |
|---|---|---|---|
| 2,660,532 | 11/1953 | Melnick ...................... | 106/54 |
| 2,822,279 | 2/1958 | Larsens et al. ............... | 106/54 |
| 3,208,860 | 9/1965 | Armistead et al. ........... | 106/54 |
| 3,392,312 | 7/1968 | Carman ...................... | 106/54 |

FOREIGN PATENTS

| | | | |
|---|---|---|---|
| 692,626 | 1/1967 | Belgium ...................... | 106/52 |

*Primary Examiner*—Helen M. McCarthy
*Attorneys*—Clarence R. Patty, Jr. and Clinton S. Janes, Jr.

ABSTRACT: This invention relates to the production of photochromic glasses having compositions within the CdO $B_2O_3$ $SiO_2$ field.

PHOTOCHROMIC GLASS

The development of practical photochromic or phototrophic glasses, as such have been variously termed, originated in U.S. Pat. No. 3,208,860. This patent discloses the production of photochromic glass articles, i.e., glass articles which will darken upon the impingement of actinic radiation thereon, e.g., sunlight, but which will return to their original state when the actinic radiation is removed. Such glasses can impart a new dimension to the ophthalmic industry since sunglasses may be produced that will protect the wearer's eyes from bright sunlight but which will become clear when the wearer moves out of the sunlight. Likewise, in the building industry, windows produced from such glasses will reduce glare from sunlight and, also, substantially decrease the amount of heat transmitted into a room from the sunlight. And, inasmuch as the amount of darkening exhibited by the glass would be proportional to the intensity of the light impinging thereupon, such a glass would be far superior to the presently available tinted windows which have an invariant optical transmittance value.

U.S. Pat. No. 3,208,806 discloses inorganic silicate glasses containing very fine-grained crystals of silver chloride and/or silver bromide and/or silver iodide which exhibit phototropic behavior, i.e., these glasses have optical transmittances that vary reversibly with the intensity of actinic radiation incident thereon. Thus, as is explained in the patent, the silver halide crystals become darker in color upon exposure to actinic radiation (commonly radiation of wavelengths between about 0.3–0.5 microns), but return to their original color when the actinic radiation is removed. As is stated in the patent, the mechanism for this behavior is not fully understood but is believed to involve a reaction between the actinic radiation and the silver halide crystals dispersed in the glassy matrix, this reaction altering the absorptive qualities of the crystals to visible radiations. Nevertheless, inasmuch as the crystals are dispersed and encased within an amorphous or glassy matrix, the removal of the actinic radiation allows the crystals to return to their former state since the glassy matrix is impermeable to and nonreactive with the reaction products formed during such exposure so that they, therefore, cannot diffuse away.

U.S. Pat. No. 3,325,299 discloses inorganic silicate glasses containing very fine-grained crystals of cadmium and/or copper chloride and/or bromide and/or iodide which also exhibit phototropic behavior. Here, as in the case of the silver halide crystals of U.S. Pat. No. 3,208,860, the cadmium and/or copper halide crystals darken under the influence of actinic radiation of the same wavelengths and will return to their original state upon withdrawal of the radiation. The mechanism for the phototropic behavior, while not understood, is believed to be similar to that obtaining for the silver halides.

Both of these patents describe the manufacture of practical photochromic glasses. Hence, whereas phototropic articles such as sunglasses made from organic plastic materials were commercially available, those articles quickly demonstrated fatigue, i.e., after several successive exposures to and removals from actinic radiation, these articles began to lose their phototropic behavior. The phototropic properties of the glasses disclosed in the above-recited patents, however, remained essentially constant after innumerable cycles of exposures and removals.

I have discovered that a small group of glasses within the $CdO-B_2O-SiO_2$ composition field, essentially free from crystals of any kind, can be produced which exhibit good photochromic properties and which are essentially free from fatigue. Thus, glass articles consisting essentially, in mole percent on the oxide basis, of about 45–70 percent CdO, 10–45 percent $B_2O_3$, and 5–35 percent $SiO_2$, will darken when subjected to actinic radiation of wavelengths between about 0.3–0.5 microns (3,000A.–5,000A.) but will return to their original optical density when this radiation is withdrawn.

Table I reports several glass compositions, in mole percent and weight percent on the oxide basis, which are demonstrative of my invention. The batch components may consist of any materials, e.g., the metallic elements, oxides, or other compounds which, on being melted together, are converted to the desired oxide compositions in the proper proportions. In producing each glass recorded in table I, the batch materials were thoroughly mixed together and melted in an air atmosphere in covered platinum crucibles at 1,200° C. for 4 hours, the melts being stirred with a platinum stirrer to achieve good homogenization. The melts were poured into stainless steel molds preheated to 300° C. and the molds containing the melts transferred to an annealer operating at 500° C. Samples (50 mm.×7 mm.×2 mm.) were cut from each of the molded glass shapes and fire polished for the optical measurements.

Table I

|  | 1 | | 2 | | 3 | |
|---|---|---|---|---|---|---|
|  | Mole | Wt. | Mole | Wt. | Mole | Wt. |
| CdO | 49 | 33.6 | 60 | 42.0 | 68 | 51.2 |
| $B_2O_3$ | 42 | 53.2 | 10 | 12.9 | 12 | 16.6 |
| $SiO_2$ | 9 | 13.2 | 30 | 45.1 | 20 | 32.2 |

|  | 4 | | 5 | | 6 | |
|---|---|---|---|---|---|---|
|  | Mole | Wt. | Mole | Wt. | Mole | Wt. |
| CdO | 60.4 | 43.6 | 69.9 | 54.7 | 59.9 | 42.8 |
| $B_2O_3$ | 22.3 | 29.6 | 22.5 | 32.5 | 20.0 | 26.4 |
| $SiO_2$ | 17.3 | 26.8 | 7.6 | 12.8 | 20.1 | 30.8 |

The quantities of CdO, $B_2O_3$, and $SiO_2$ must be held within the above-recited ranges therefor in order to obtain transparent glasses exhibiting good photochromic behavior. Hence, where the amount of CdO is greater than about 70 mole percent, the melt devitrifies as it is being cooled to a glass and where the amount of CdO is less than about 45 mole percent, two immiscible liquids result leading to an opal glass. However, although the amounts of CdO, $B_2O_3$, and $SiO_2$ are critical to the invention, minor amounts of compatible metal oxides such as $Na_2O$, $K_2O$, CaO, SrO, ZnO, PbO, and MgO may be included to modify the melting and forming qualities of the glass. Fluorine may also be added to the batch to improve melting and reduce the tendency of the melt to devitrify during cooling. The total of all such additions ought not to exceed about 10 mole percent.

Doping of the glasses with copper and/or silver (up to about 0.05 weight percent CuO and up to about 0.5 weight percent Ag) appears to improve the sensitivity thereof to the actinic radiation and to increase the rate of darkening and fading exhibited by the glasses upon exposure to and removal from the actinic radiation.

An X-ray diffraction analysis and electron microscope examination of these glasses demonstrated the absence of bona fide crystals. An EPR spectrum (electron paramagnetic resonance) of the cadmium borosilicate glass was obtained in an attempt to discover the mechanism for the photochromic behavior. Examination of this spectrum suggested the possibility that $Cd^+$ is responsible for the photochromic behavior but considerably more study would be required to confirm this.

In order to test the possible fatigue of the cadmium borosilicate glasses of this invention, example 1 was cycled in the following manner:

1. Exposed to ultraviolet radiation (3650A.) produced by a commercial "Mineralite" long wave ultraviolet lamp having a 9-watt input, the output being filtered to remove a major proportion of the visible energy, for 15 minutes;

2. Exposed to infrared radiations at 500 watts for 15 minutes;

3. Cooled at room temperature for 30 minutes.

The heating acted to bleach the color out of the glass more rapidly than the normal fading thereof when the actinic radiation is merely withdrawn from the glass. The optical transmittance of the glass decreased from about 92 to 43 percent after the first exposure to the ultraviolet radiation and in the 1,250th cycle the glass decreased in transmittance from about 91 to 44 percent. Such findings indicate that these glasses are subject to virtually no fatigue.

In order to determine the fading rate of these glasses at room temperature, the actinic radiation was removed from the surface of the glass by means of a commercial cutoff filter opaque to radiations shorter than 5000A. and the transmittance of the glass continually recorded, the time being noted that it takes to recover to the geometric average ($\sqrt{T_o \times T_{oo}}$) of the initial transmittance ($T_o$) and the transmittance at infinite exposure ($T_{oo}$). This value is referred to as the half-fading time ($h_R$).

Table II clearly illustrates the photochromic behavior of the glasses of this invention. Each example was exposed to the commercial "Mineralite" for 15 minutes, this time arbitrarily being deemed to constitute infinite exposure.

Table II

| Example No. | $T_o$ | $T_{oo}$ | $H_R$ |
| --- | --- | --- | --- |
| 1 | 92 | 43 | 33 minutes |
| 2 | 85 | 65 | 45 minutes |
| 3 | 90 | 64 | 45 minutes |
| 4 | 90 | 40 | 16 minutes |
| 5 | 80 | 35 | 10 minutes |
| 6 | 95 | 60 | 14 minutes |

I claim:

1. A photochromic article comprising a body of glass consisting essentially, in mole percent on the oxide basis, of about 45–70 percent CdO, 10–45 percent $B_2O_3$, and 5–35 percent $SiO_2$.

2. A glass composition which is potentially photochromic consisting essentially, in mole percent on the oxide basis, of about 45–70 percent CdO, 10–45 percent $B_2O_3$, and 5–35 percent $SiO_2$.

3. A glass composition according to claim 2 also containing up to 0.05 percent by weight CuO and/or up to 0.5 percent by weight Ag.